United States Patent
Sato et al.

(10) Patent No.: US 10,071,444 B2
(45) Date of Patent: Sep. 11, 2018

(54) LASER CLADDING APPARATUS AND OPERATING METHOD

(71) Applicant: TOYOTA JIDOSHA KABUSHIKI KAISHA, Toyota-shi (JP)

(72) Inventors: Akio Sato, Toyota (JP); Yoshinori Ishikawa, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 504 days.

(21) Appl. No.: 14/816,392

(22) Filed: Aug. 3, 2015

(65) Prior Publication Data
US 2016/0121428 A1    May 5, 2016

(30) Foreign Application Priority Data
Oct. 30, 2014  (JP) .................... 2014-221579

(51) Int. Cl.
*B23K 26/14*  (2014.01)
*B23K 26/342*  (2014.01)
*B23K 26/70*  (2014.01)
*B23K 26/144*  (2014.01)
*B23K 101/00*  (2006.01)

(52) U.S. Cl.
CPC .......... *B23K 26/702* (2015.10); *B23K 26/144* (2015.10); *B23K 26/342* (2015.10); *B23K 2201/006* (2013.01)

(58) Field of Classification Search
CPC ... B23K 26/702; B23K 26/342; B23K 26/144
See application file for complete search history.

(56) References Cited

U.S. PATENT DOCUMENTS

| | | | | |
|---|---|---|---|---|
| 9,623,514 | B2* | 4/2017 | Iwatani | B23K 26/1464 |
| 2006/0169679 | A1* | 8/2006 | Sato | B23K 26/103 |
| | | | | 219/121.64 |
| 2010/0078411 | A1* | 4/2010 | Hughes | B23K 26/147 |
| | | | | 219/121.63 |
| 2014/0370203 | A1* | 12/2014 | Sailer | C23C 24/04 |
| | | | | 427/455 |
| 2015/0328718 | A1* | 11/2015 | Iwatani | B23K 26/1464 |
| | | | | 219/121.84 |

FOREIGN PATENT DOCUMENTS

| | | |
|---|---|---|
| JP | 4026421 | 12/2007 |
| JP | 4038724 | 1/2008 |
| JP | 2008-149326 | 7/2008 |
| JP | 2009-45638 | 3/2009 |

* cited by examiner

*Primary Examiner* — Geoffrey S Evans
(74) *Attorney, Agent, or Firm* — Oblon, McClelland, Maier & Neustadt, L.L.P.

(57) ABSTRACT

A laser cladding apparatus includes a powder supplier to supply metal powder to a portion to be processed, a laser to irradiate the portion to be processed with laser so as to melt the metal powder for cladding, and a controller. The powder supplier includes a gas pressure gauge, and the controller stores, as an initial value, a gas pressure value measured by the gas pressure gauge when the metal powder supplied by the gas pressure reaches the portion to be cladding-processed. In operation after storing the initial value, the controller sets, as a reference time, timing when the gas pressure gauge measures a same pressure as the initial value, and outputs a start signal for laser irradiation to the laser based on the reference time.

4 Claims, 6 Drawing Sheets

Normal

LASER CLADDING APPARATUS AND OPERATING METHOD

CLAIM OF PRIORITY

The present application claims priority from Japanese patent application JP 2014-221579 filed on Month Date, Year, the content of which is hereby incorporated by reference into this application.

BACKGROUND

Technical Field

The present invention relates to laser cladding apparatuses and their operating method.

Background Art

For instance, in order to form a ring-shaped valve-seat of a cylinder head for internal-combustion engine, metal powder is supplied to a valve-seat portion (portion to be processed) from a powder supplying device while applying laser there from a laser oscillator for cladding of the metal powder supplied. Such a processing method is generally called laser cladding. For a favorable cladding state by laser cladding, it is important to adjust the timing to start laser irradiation and to supply metal powder to the portion to be processed appropriately. If the timing to apply laser and supply metal powder at the time of start of cladding is not appropriate, unwelding or alloying with base material occurs, thus leading to a failure in cladding of a desired quality, and the product obtained may be faulty.

Patent Document 1 discloses one exemplary means to solve this, and the device for determination of start timing of metal powder supply described there includes: reach timing measurement means to measure timing when metal powder supplied from powder supply means reaches the cladding portion (portion to be processed) in the state where laser light to be irradiated for cladding by welding is not applied; and supply timing determination means to determine the starting timing to supply metal powder with reference to the irradiation of laser light during welding based on the measured reach timing. Specifically, an optical sensor is disposed at a portion to the processed, the optical sensor including a phototransmitter and a photoreceiver to detect the reach timing of powder, and the start timing to supply metal powder with reference to irradiation of laser light for welding is determined based on a signal from the optical sensor.

RELATED ART DOCUMENTS

Patent Document

Patent Document 1: JP 4026421 B

SUMMARY

As described in Patent Document 1, the method includes the step of measuring reach timing when metal powder fed from powder supply means reaches the cladding portion (portion to be processed) in the state where laser light is not applied; and determining the starting timing to supply metal powder based on the measured reach timing. Such a method has an advantageous effect of avoiding wasted product of bad quality, and so reducing the manufacturing time and the cost. The device, however, includes the optical sensor at the portion to be processed, the optical sensor being made up of a phototransmitter and a photoreceiver to detect the reach timing of powder. Since the vicinity of the portion to be processed, i.e., the portion where metal powder is molten, becomes hot at around 1,000° C. or higher, it is difficult to keep the optical sensor disposed in an appropriate state. Although damage by heat can be avoided by keeping the optical sensor away from the processing point generating heat, then measuring errors will occur. The optical sensor may be damaged from reflected light or scattered light of the laser light. From these points, it is difficult to use this method to an actual device. Further, the method basically determines the start timing to supply metal powder with reference to irradiation with laser light for welding, meaning that it requires complicated means to control the start timing to supply metal powder.

In view of the aforementioned circumstances, the present invention aims to provide a laser cladding apparatus having a simpler configuration, which is capable of adjusting timing to start laser irradiation and supply metal powder to a portion to be processed appropriately, and operating as an actual device stably for a long time, and to provide its operating method.

A first aspect of a laser cladding apparatus of the present invention basically includes: a powder supplying device to supply metal powder to a portion to be processed; a laser irradiation device to irradiate the portion to be processed with laser so as to melt the metal powder for cladding; and control means. The powder supplying device includes means to supply metal powder to the portion to be processed by gas pressure, and gas pressure measurement means to measure the gas pressure, and the control means includes storage means to store, as an initial value, a measurement by the gas pressure measurement means when metal powder supplied by the gas pressure reaches the portion to be processed, and the control means determines that metal powder reaches the portion to be processed when the gas pressure measurement means measure, after starting the supply of metal powder, a same pressure as the initial value in operation after storing the initial value.

The laser cladding apparatus of the present invention is configured to firstly store, as an initial value, a measurement by the gas pressure measurement means when metal powder supplied by the gas pressure reaches the portion to be processed. Determination whether metal powder reaches the portion to be processed or not may be made by an appropriate sensor or made visually. Then in operation after storing the initial value, when the gas pressure measurement means measures a same pressure as the initial value, the control means determines that metal powder reaches the processing to be processed. In this way, in the operation after storing the initial value, determination whether metal powder reaches the portion to be processed or not can be made based on gas pressure only, which does not require a sensor to detect whether metal powder reaches the portion to be processed or not or visual monitoring. Then, the overall configuration of the laser cladding apparatus can be simplified.

A second aspect of a laser cladding apparatus of the present invention at least includes: a powder supplying device to supply metal powder to a portion to be processed; a laser irradiation device to irradiate the portion to be processed with laser so as to melt the metal powder for cladding; and control means. The powder supplying device includes means to supply metal powder to the portion to be processed by gas pressure, and gas pressure measurement means to measure the gas pressure, and the control means includes storage means to store, as an initial value, a measurement by the gas pressure measurement means when metal powder supplied by the gas pressure reaches the portion to be processed, and irradiation timing determination means to set, as a reference time, timing when the gas pressure measurement means measures, after starting the supply of metal powder, a same pressure as the initial value in operation after storing the initial value, and output a start signal for laser irradiation to the laser irradiation device based on the reference time.

The laser cladding apparatus of this aspect is configured to adjust timing to start laser irradiation and to supply metal powder to the portion to be processed based on the gas pressure value when metal powder reaches the portion to be cladding-processed that is measured beforehand. This can simplify a system or the like of the laser cladding apparatus of the present invention to adjust timing to start laser irradiation and to supply metal powder to the portion to be processed, and so the overall configuration of the laser cladding apparatus also can be simplified. In the stage where the initial value is stored, determination whether metal powder reaches the portion to be processed or not may be made by an appropriate sensor or made visually. In operation after storing the initial value, however, at timing when the gas pressure measurement means measures a same pressure as the initial value, the control means determines that metal powder reaches the processing to be processed. Then, based on such timing as a reference time, irradiation timing to output a start signal for laser irradiation to the laser irradiation device is determined. That is, in the operation after storing the initial value, determination whether metal powder reaches the portion to be processed or not can be made based on gas pressure only, which does not require a sensor to detect whether metal powder reaches the portion to be processed or not or visual monitoring. Then, the overall configuration of the laser cladding apparatus can be simplified.

Herein the irradiation timing determination means may output a start signal for laser irradiation immediately after the gas pressure measurement means measures the same pressure as the initial value, or may output such a signal after a slight time difference. This may be selected in accordance with the laser cladding conditions.

In one form of the laser cladding apparatus of the present invention, the laser irradiation device includes a nozzle exit sensor detachably to detect reaching of metal powder to the portion to be processed, the gas pressure measurement means measures gas pressure when receiving a reach signal from the nozzle exit sensor, and the control means stores a value of the gas pressure as an initial value.

The laser cladding apparatus in this form is configured to detach the nozzle exit sensor after the initial value is stored. This can avoid the damage of the nozzle exit sensor due to heat. Whether metal powder supplied by gas pressure reaches or not to the portion to be cladding-processed can be found simply by an on-off signal, for example, and a simple sensor may be disposed in the vicinity of the nozzle of the portion to be processed to fulfill desired purpose sufficiently. Although the nozzle exit may be checked visually without using such a sensor to determine the timing when metal powder reaches to portion to be cladding-processed, the following describes the case using a sensor for comparison with the conventional techniques.

The present invention further discloses a method for operating such a laser cladding apparatus. In this method, operation until the storage means of the control means stores the initial value is performed without applying laser, and in operation after the initial value is stored, laser is applied by activating the laser irradiation device.

The present invention can provide a laser cladding apparatus having a simpler configuration, which is capable of adjusting timing to start laser irradiation and supply metal powder to a portion to be processed appropriately, and operating as an actual device stably for a long time, and its operating method.

DETAILED DESCRIPTION OF THE EMBODIMENT(S)

Figure 1:
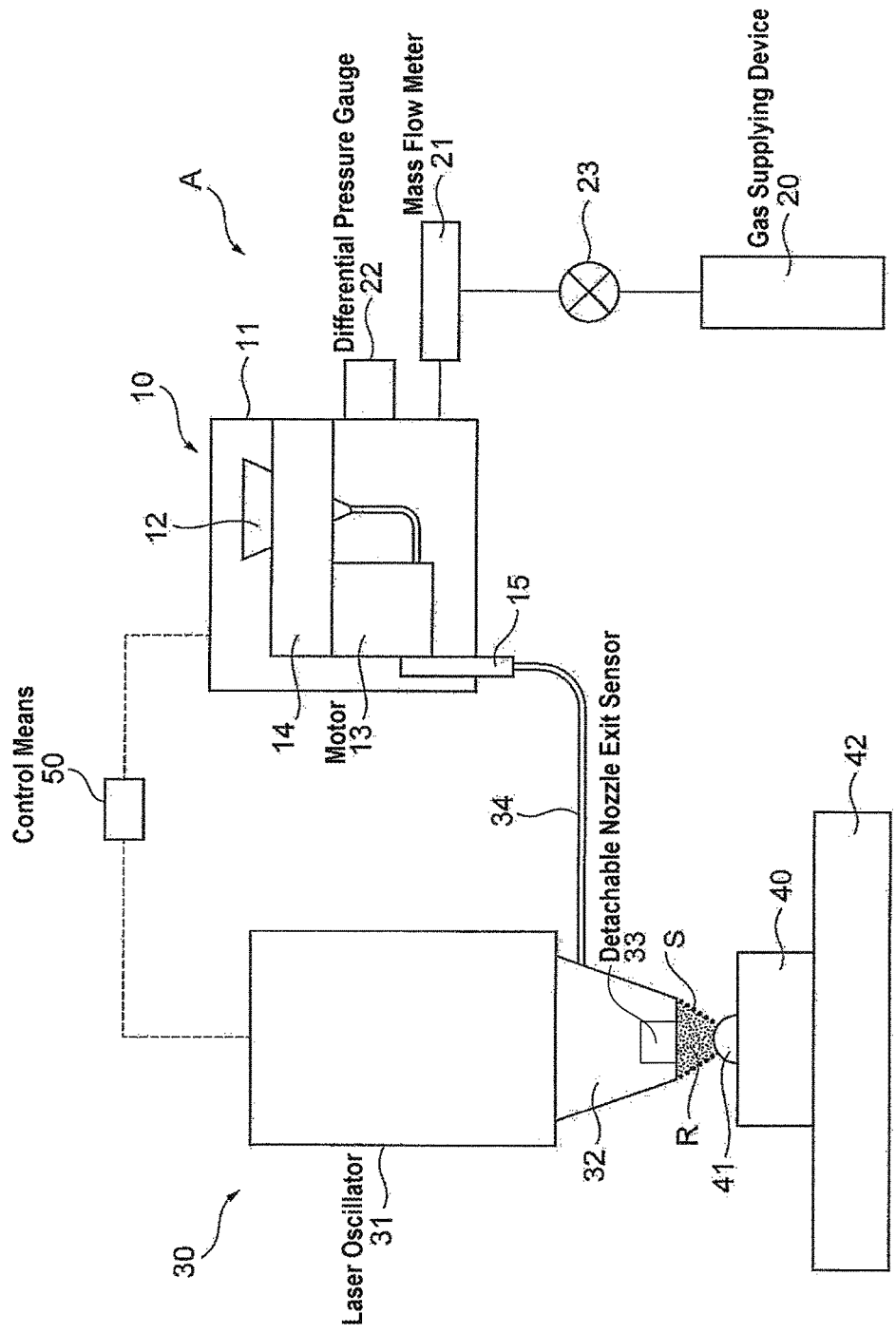
FIG. 1 schematically illustrates the overall laser cladding apparatus of the present invention.

Referring to the drawings, the following describes one embodiment of a laser cladding apparatus of the present invention.

FIG. 1 schematically illustrates the overall laser cladding apparatus of the present invention, and a laser cladding apparatus A basically includes a powder supplying device (e.g., a powder supplier) 10, a laser irradiation device 30, and control means (e.g., a controller) 50.

The powder supplying device 10 includes a hermetically-sealed vessel 11, and the hermetically-sealed vessel 11 accommodates a hopper 12 serving as a reservoir of metal powder S, a motor 13 to send and supply metal powder S in the hopper 12, a load cell 14 to measure metal powder S to be sent and supplied, an exhaust slot 15 to exhaust metal powder S to be supplied toward the laser irradiation device 30, and the like. The powder supplying device 10 further includes a gas supplying device (gas cylinder or the like) 20 to supply pressured gas to pressure-feed metal powder S to the laser irradiation device 30, and a gas flow rate controller (mass flowmeter) 21 to control the flow rate of gas to be sent from the gas supplying device 20 into the powder supplying device 10, and includes a differential pressure gauge 22 to measure the pressure in the hermetically-sealed vessel 11 that changes with gas sent and supplied. In the drawing, reference numeral 23 denotes a gas valve to stop the sending of gas from the gas supplying device 20.

The powder supplying device 10 in this form has been conventionally known as in described in JP 3826063 B, for example, and so the detailed descriptions thereon are omitted. As described in this patent publication also, the powder supplying device 10 in this form can measure the fluctuation of gas pressure using the differential pressure gauge 22 when metal powder S is sent by gas pressure from the powder supplying device 10 to the laser irradiation device 30. The differential pressure gauge 22 may be attached to the vicinity of the exhaust slot 15 so as to directly measure the pressure in the exhaust slot 15.

The laser irradiation device 30 includes a laser oscillator (e.g., a laser) 31 as a heating source, and a processing nozzle 32. These laser oscillator 31 and processing nozzle 32 have been conventionally known as in described in JP 4299157 B, for example, and so the detailed descriptions thereon are omitted.

The processing nozzle 32 of the laser irradiation device 30 and the exhaust slot 15 of the powder supplying device 10 are connected via a hose 34, so that metal powder S is sent and supplied from the powder supplying device 10 toward the processing nozzle 32 in accordance with a signal from the control means 50 by pressure of gas supplied from the gas supplying device 20 as described above, and the metal powder is blown off from the tip end of the processing nozzle 32.

The metal powder S blown off is supplied from the processing nozzle 32 to a portion to be cladding-processed 41 of a work piece 40 that is a valve seat portion of a cylinder head for internal-combustion engine, for example. The metal powder is then molten there by heating from laser light R applied from the processing nozzle 32 to be in a cladding state. During the laser cladding, the work piece 40 is moved as needed by a work-piece moving device 42, such as a NC. The laser irradiation device 30 also is moved based on a signal from the control means 50.

The laser irradiation device 30 includes a detachable nozzle exit sensor 33, which is optional, in the vicinity of the exit of the processing nozzle. As described later, this nozzle exit sensor is disposed during the step of setting "pressure P during ejection" before actual operation, but the nozzle exit sensor is removed because it is not necessary for the actual operation.

Figure 2:
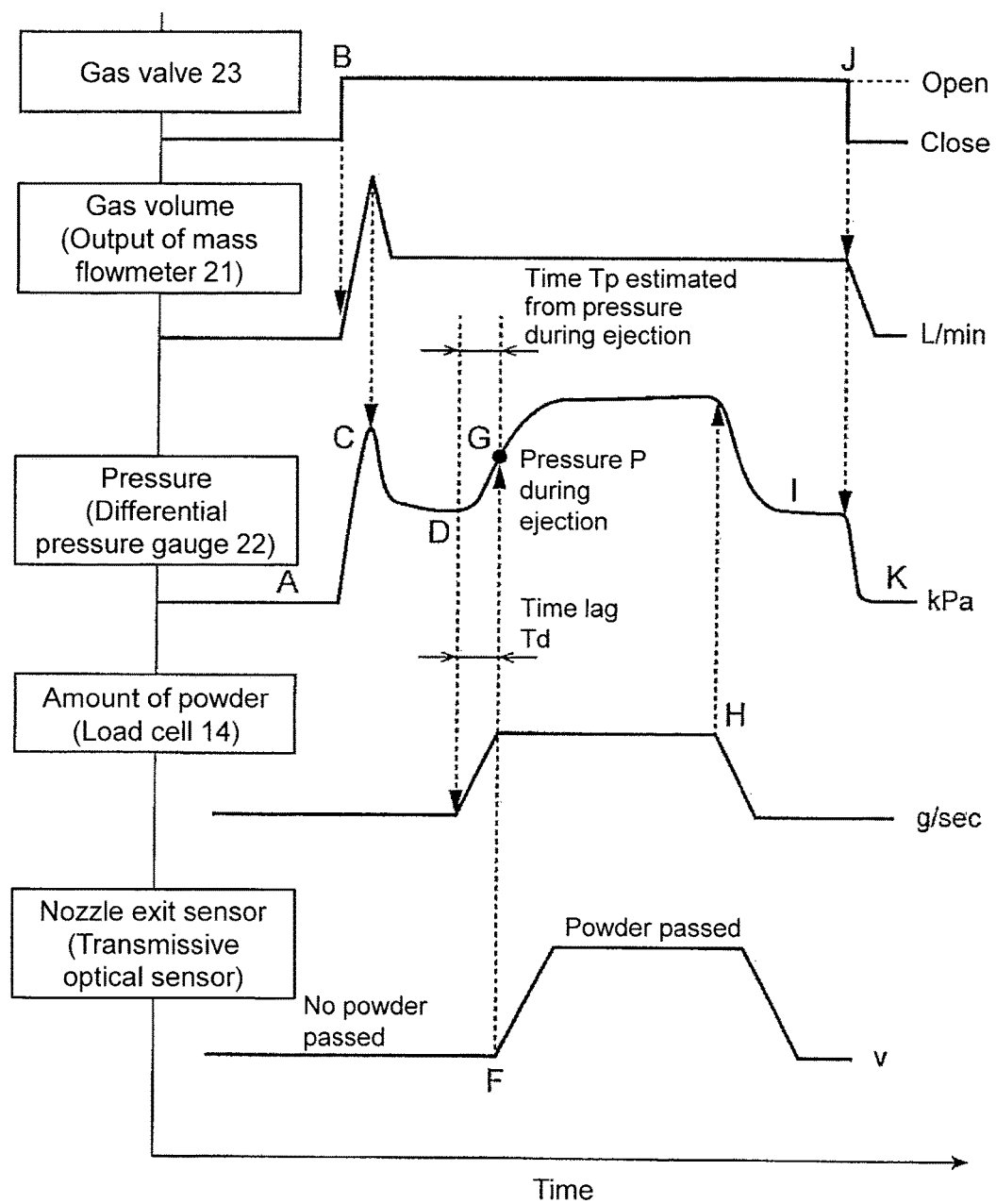
FIG. 2 is a time chart to describe the operating process of the laser cladding apparatus of the present invention.

Referring next to FIG. 2, the operation of the laser cladding apparatus A as stated above is described. In FIG. 2, point A denotes the state before operation, where the gas valve 23 described above is closed, and the output (gas volume) of the mass flowmeter 21 is 0. The pressure value at the differential pressure gauge 22 also is zero, the measurement of the load cell 14 (the amount of metal powder) also is zero, and signal pressure of the nozzle exit sensor also is zero.

To start the processing, the gas valve 23 is firstly opened (point B in FIG. 2). Following the opening of the gas valve 23, gas flows into the hermetically-sealed vessel 11 of the powder supplying device 10. The gas volume thereof is detected from an output value of the mass flowmeter 21. After an overshooting, the gas volume has a constant value that is set beforehand, and then keeps the value until the gas valve 23 is closed. The pressure value (in this example, the pressure value in the hermetically-sealed vessel 11) of the differential pressure gauge 22 increases with the opening (point B in FIG. 2) of the gas valve 23, and increases to the maximum so as to be substantially proportional to the gas volume supplied (point C in FIG. 2). Then the pressure value decreases with a decrease in the gas volume supplied, and when the supply of the gas volume becomes constant, the pressure value becomes stable (point D in FIG. 2).

When the measurement at the differential pressure gauge 22 has a stable value, an operator or the control means 50 activates the motor 13 of the powder supplying device 10 to start supplying of metal powder S to the laser irradiation device 30. The amount of metal powder S supplied is measured by the load cell 14 disposed in the powder supplying device 10. The metal powder S supplied is sent from the exhaust slot 15 of the powder supplying device 10 to the processing nozzle 32 of the laser irradiation device 30 via the hose 34. A certain time is required from the detection of the amount of powder by the load cell 14 to reaching of the metal powder S to the portion to be cladding-processed 41. In this specification, such a time difference is referred to as "time lag Td". The nozzle exit sensor does not output a detection signal when the powder supplying device 10 starts to supply metal powder S (point D in FIG. 2), and outputs a signal indicating the passage of powder after the lapse of time lag Td (point F in FIG. 2).

Metal powder S typically has a particle-size distribution such that they are the mixture of different particle sizes. This makes a particle smaller in diameter enter the hose 34 first when they pass through the hose 34, and so pipeline resistance in the hose 34 through which metal powder S flows through increases over time. As a result, as indicated by the pressure value of the differential pressure gauge 22 in FIG. 2, the pressure in the hermetically-sealed vessel 11 gradually increases from the stable pressure value described above (point D in FIG. 2), and increases until the metal powder S flows through the hose 34 as a steady flow, and then has a substantially stable value.

The control means 50 continuously detects the measurement of the differential pressure gauge 22, and stores, as pressure P during ejection, a measurement (point G in FIG. 2) of the differential pressure gauge 22 (gas pressure measurement means) when the metal powder S supplied by gas pressure reaches the portion to be cladding-processed 41. After point G in FIG. 2 as well, supply of the metal powder S is continued, and after the lapse of a required time duration that is set beforehand, the control means 50 stops the supply of the metal powder S (point H in FIG. 2). Since the resistance in the hose 34 disappears, the pressure in the hermetically-sealed vessel 11 gradually decreases (region I in FIG. 2), and the pressure has a value that is the same as the pressure value at point D in FIG. 2 as stated above.

At this time, the control means 50 closes the gas valve 23 (point J in FIG. 2). The closing of the gas valve 23 makes the output of the mass flowmeter 21 zero, and the pressure in the hermetically-sealed vessel 11 also becomes zero that is the initial value (point K in FIG. 2). The amount of metal powder (output of the load cell 14) also becomes 0, and after a small time difference, the output signal of the nozzle exit sensor also becomes zero. Note here that these stages of the operation are performed as a preliminary job for the operation without activating the laser irradiation device 30. The metal powder S supplied therefore is still not-molten, and can be reused.

The following describes the procedure during the actual operation. As described above, the gas pressure value when metal powder S supplied by gas pressure reaches the portion to be cladding-processed 41 in the laser cladding apparatus A, i.e., the pressure P during ejection that is the pressure value in the hermetically-sealed vessel 11 measured by the differential pressure gauge 22, is already known from the preliminary job performed without activating the laser irradiation device 30, and the control means 50 stores the value P as an initial value. For the actual operation as well, the control means 50 continuously measures the pressure value of the differential pressure gauge 22 as gas pressure measurement means. Then, when after starting the supply of metal powder S, the measurement equals the value of the "pressure P during ejection", it is determined that the metal powder S reaches the portion to be processed 41 described above. Then the control means 50 outputs a starting signal for laser irradiation to the laser irradiation device 30. The "pressure P during ejection" is measured when metal powder S supplied actually reaches the portion to be cladding-processed 41 in the preliminary job as stated above, and so in the actual operation, metal powder S highly likely reaches the portion to be cladding-processed 41 when the measurement shows the pressure P during ejection. That is, the "time lag Td" (time lag actually occurred) and "time Tp estimated from the pressure P during ejection" illustrated in FIG. 2 agree or highly likely agree approximately.

For this reason, the laser cladding apparatus A of the present invention makes the gas pressure measurement means (differential pressure gauge 22) continuously measure the pressure in the hermetically-sealed vessel 11 in the actual operation that is performed after the "pressure P during ejection" is stored as an initial value, and the control means 50 outputs (means to activate this corresponds to "irradiation timing determination means" of the present invention) a starting signal for laser irradiation to the laser irradiation device 30 when, after starting the supply of metal powder S, the same pressure as the initial value stored is detected. This enables precise adjustment of timing to start laser irradiation and to supply metal powder S to the portion to be processed 41. In this way, the laser cladding apparatus A of the present invention does not use the nozzle exit sensor as stated above during the actual operation after the "pressure P during ejection" is stored as an initial value, i.e., does not use a signal indicating actual ejection of metal powder S from the processing nozzle 32, and can adjust timing to start laser irradiation and to supply metal powder S to the portion to be processed 41 precisely. This can simplify the apparatus and facilitate the operation, and further indicates the possibility of stable operation as an actual device for a long time.

For the actual operation, optimum laser cladding can progress by outputting a starting signal for laser irradiation concurrently with the detection of the same pressure as the initial value stored in some cases, and by outputting a starting signal a little late in other cases. That is, the "time when the same pressure as the initial value is measured" is a "time" just used for a reference time to output a start signal for laser irradiation, and a start signal for laser irradiation may be output later in the actual operation. The nozzle exit sensor may be omitted, and an operator recognizes visually the timing when metal powder S reaches the portion to be cladding-processed 41, and stores the pressure value of the gas pressure measurement means (differential pressure gauge 22) at this time as an "initial value". During the continuous actual operation, the laser irradiation device may be stopped once, and then the preliminary job to store the initial value may be performed for readjustment of the timing.

EXEMPLARY EXPERIMENTS

The following describes exemplary experiments conducted by the present inventor.

Exemplary Experiment 1

Influences from the Amount of Powder

The laser cladding apparatus A having the configuration of FIG. 1 was prepared. The powder supplying device 10 had a configuration described in JP 3826063 B, and the laser oscillator 31 and the processing nozzle 32 had configurations described in JP 4299157 B. The hose 34 from the exhaust slot 15 of the powder supplying device 10 to the processing nozzle 32 used had an inner diameter of 6 mm and a length of 2 m. Nitrogen gas was supplied at the rate of 8 L/min to send metal powder S. A commercially-available transmissive optical sensor was attached detachably as a nozzle exit sensor. In this experiment, the set amount of metal powder S was changed as in 0.8 g/sec, 0.9 g/sec, and 1.0 g/sec. Then for these set amounts of powder, the "pressure P during ejection" detected by the differential pressure gauge 22 when the nozzle exit sensor detects powder was set at 2.0 KPa.

The "time lag Td" was measured in the preliminary job as stated above without activating the laser oscillator 31. In the subsequent operation, a time duration was measured between when the differential pressure gauge 22 measured, after starting supply of metal powder S, the value of the pressure P during ejection (2.0 KPa) obtained beforehand and when the powder supplying device 10 started to supply metal powder S (point D in FIG. 2). Table 1 shows the result. This time duration is referred to as "time Tp estimated from the pressure P during ejection". As shown in Table 1, they agree substantially, and so it can be confirmed that timing to start laser irradiation and to supply metal powder S to the portion to be processed 41 was successfully adjusted precisely irrespective of the amount of metal powder S supplied by activating the laser oscillator 31 when the differential pressure gauge 22 detects the value of the pressure P during ejection obtained beforehand.

TABLE 1

| Powder amount | Td | P | Tp |
| --- | --- | --- | --- |
| 0.8 g/sec | 1.25 sec | 2.0 KPa | 1.25 sec |
| 0.9 g/sec | 1.25 sec | 2.0 KPa | 1.25 sec |
| 1.0 g/sec | 1.30 sec | 2.0 KPa | 1.25 sec |

Exemplary Experiment 2

Influences from the Gas Volume

The same apparatus as in Experiment 1 was used. In this experiment, however, the set amount of metal powder S was 1.0 g/sec, and nitrogen gas to send the metal powder S was changed in three stages of 7, 8 and 9 L/min. In this experiment as well, for these gas volumes, the pressure P during ejection detected by the differential pressure gauge 22 when the nozzle exit sensor detects powder was set at 2.0 KPa.

Similarly to Experiment 1, time lag Td and time Tp estimated from the pressure P during ejection were measured. Table 2 shows the result. As shown in Table 2, they agree substantially in this case as well, and it can be confirmed that timing to start laser irradiation and to supply metal powder S to the portion to be processed 41 was successfully adjusted precisely irrespective of different gas volumes by activating the laser oscillator 31 when the differential pressure gauge 22 detects the value of the pressure P during ejection obtained beforehand.

TABLE 2

| Gas volume | Td | P | Tp |
| --- | --- | --- | --- |
| 7 L/min | 1.95 sec | 2.0 KPa | 1.90 sec |
| 8 L/min | 1.20 sec | 2.0 KPa | 1.15 sec |
| 9 L/min | 1.05 sec | 2.0 KPa | 1.00 sec |

[Other Advantageous Effects from the Laser Cladding Apparatus A of the Present Invention]

The following describes other advantageous effects from the laser cladding apparatus A of the present invention, by way of exemplary experiments.

Exemplary Experiment 3

The same device as in Experiment 1 was used. In this experiment, the supplied amount of metal powder S was 1.0 g/sec, and nitrogen gas to send the metal powder S was 8 L/min. The device was operated without activating the laser oscillator 31. Then pressure in the hermetically-sealed vessel 11 of the powder supplying device 10 was measured by intentionally changing the state of the device side. FIGS. 3 to 6 show the results.

Figure 3:
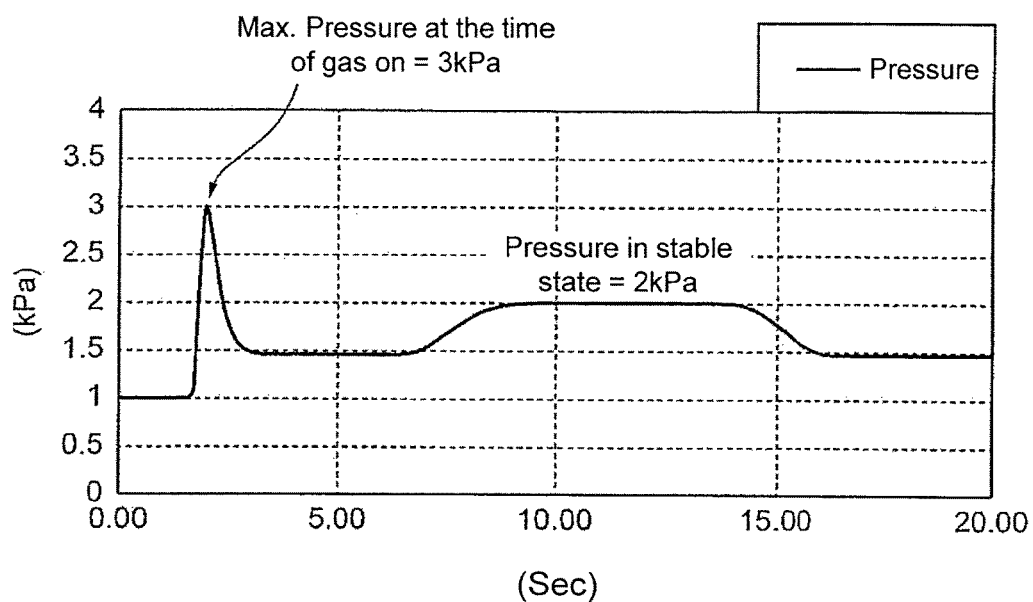
FIG. 3 is a first drawing to describe additional advantageous effect from the laser cladding apparatus of the present invention.
Figure 4:
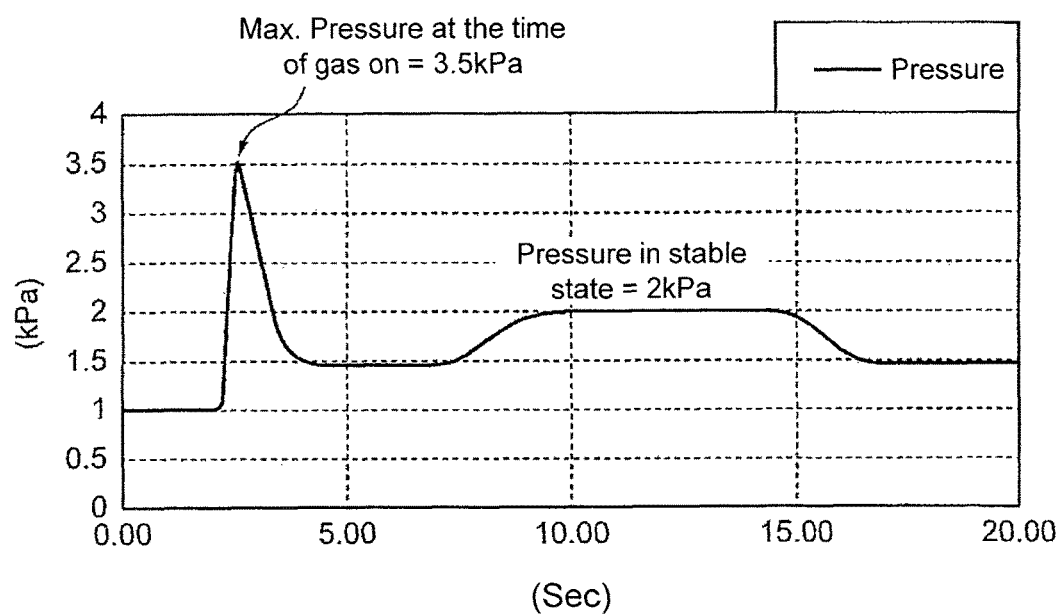
FIG. 4 is a second drawing to describe additional advantageous effect from the laser cladding apparatus of the present invention.
Figure 5:
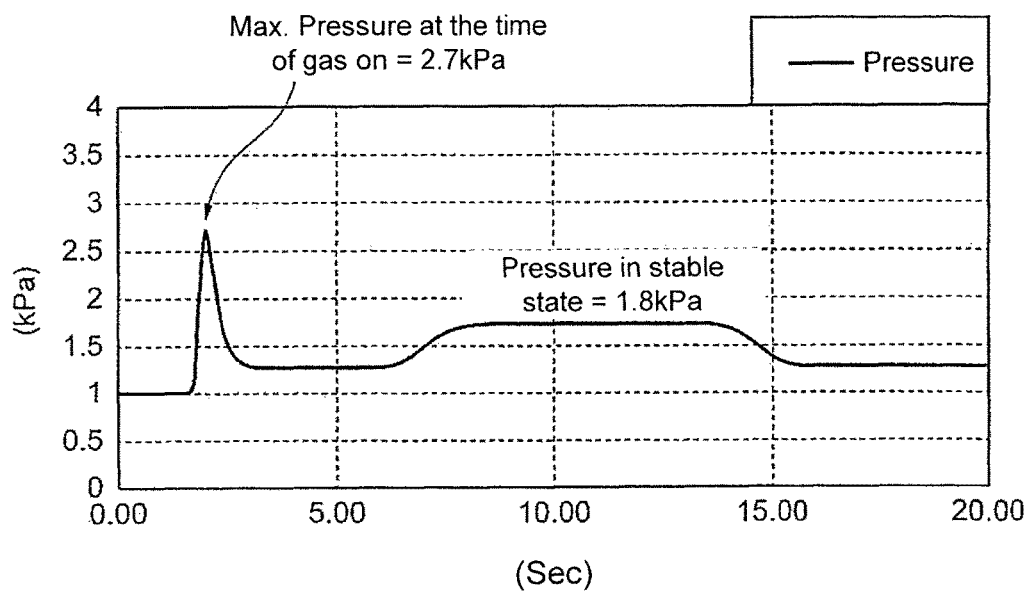
FIG. 5 is a third drawing to describe additional advantageous effect from the laser cladding apparatus of the present invention.
Figure 6:
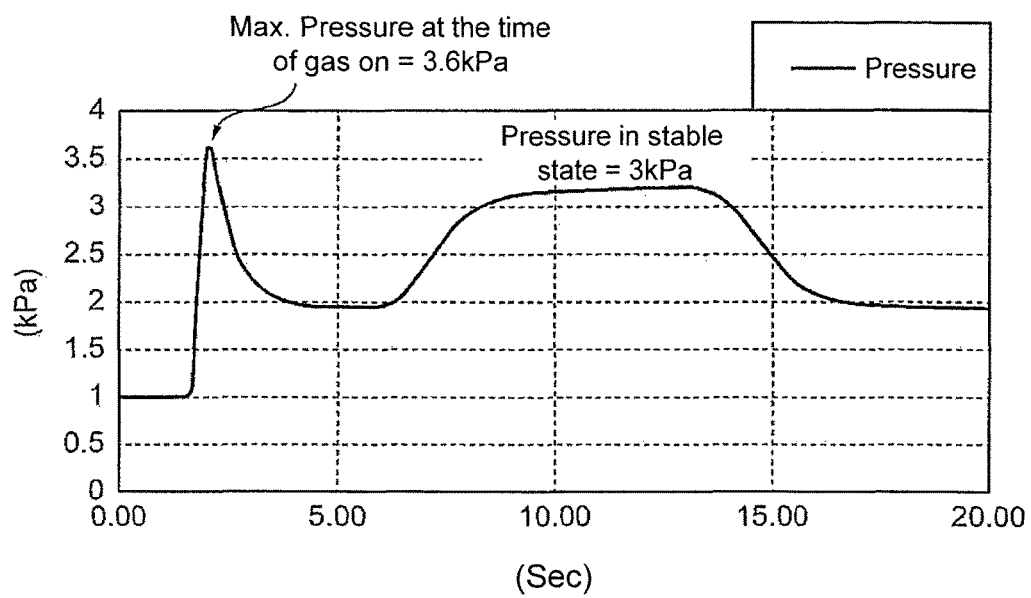
FIG. 6 is a fourth drawing to describe additional advantageous effect from the laser cladding apparatus of the present invention.

FIG. 3 shows a normal state of the device, FIG. 4 shows the case where metal powder S was left in the hose 34, FIG. 5 shows the case where the hose 34 was broken or detached, and FIG. 6 shows the case where the hose 34 was bent at some part to hinder the gas flow.

As illustrated in FIG. 3, in the normal state, the maximum pressure was 3 KPa when gas was ON, and the pressure was 2 KPa in a stable state. On the other hand, in the case where metal powder S was left in the hose 34, as shown in FIG. 4, the maximum pressure was 3.5 KPa when gas was ON, and pressure was 2 KPa in a stable state. In this way, the maximum pressure at the time of gas ON increased than the normal state, and this is because the hose 34 clogged with the metal powder S, and the flow had to pass through such clogging. This shows that, if the maximum pressure at the time of gas ON increases compared with the normal state in the actual operation, clogging in the hose 34 can be expected.

As shown in FIG. 5, when the hose 34 was broken or detached at some part, the maximum pressure was 2.7 KPa when gas was ON, and the pressure was 1.8 KPa in a stable state. This is because gas leaks from the hose 34 at the time of gas ON, and so the pressure in the hermetically-sealed vessel 11 does not increase, so that the maximum pressure and the stable pressure were lower than normal values. This shows that, if both of the maximum pressure at the time of gas ON and the stable pressure are lower than the normal values in the actual operation, abnormality that is breakage or detachment of the hose 34 can be expected.

As shown in FIG. 6, when the hose 34 was bent at some part, the maximum pressure was 3.6 KPa when gas was ON, and the pressure was 3 KPa in a stable state. This is because gas did not flow smoothly at the time of gas ON, and so the pressure in the hermetically-sealed vessel 11 increased, so that both of the maximum pressure and the stable pressure were higher than normal values. This shows that, if both of the maximum pressure at the time of gas ON and the stable pressure are higher than the normal values in the actual operation, abnormality that is bending of the hose 34 at some part can be expected.

In this way, the laser cladding apparatus A of the present invention monitors the pressure in the hermetically-sealed vessel 11 of the powder supplying device 10 in the actual operation, and has an additional advantageous effect of enabling abnormal detection relating to the hose 34.

DESCRIPTION OF SYMBOLS

A Laser cladding apparatus
S Metal powder
R Laser light
10 Powder supplying device
11 Hermetically-sealed vessel
12 Hopper
13 Motor
14 Load cell
15 Exhaust slot of metal powder
20 Gas supplying device
21 Gas flow rate controller (mass flowmeter)
22 Differential pressure gauge to measure pressure in hermetically-sealed vessel
23 Gas valve
30 Laser irradiation device
31 Laser oscillator
32 Processing nozzle
34 Hose
40 Work piece
41 Portion to be processed
42 Work-piece moving device
50 Control means

What is claimed is:

1. A laser cladding apparatus at least comprising:
a powder supplier to supply metal powder to a portion to be processed;
a laser to irradiate the portion to be processed with laser so as to melt the metal powder for cladding; and
a controller, wherein
the powder supplier is to supply the metal powder to the portion to be processed by gas pressure, and includes a gas pressure gauge to measure the gas pressure, and
the controller to store, as an initial value, a measurement by the gas pressure gauge when the metal powder supplied by the gas pressure reaches the portion to be processed, and the controller is configured to set, as a reference time, timing when the gas pressure gauge measures a same pressure as the initial value in operation after storing the initial value, and to output a start signal for laser irradiation to the laser based on the reference time.

2. A laser cladding apparatus at least comprising:
a powder supplier to supply metal powder to a portion to be processed;
a laser to irradiate the portion to be processed with laser so as to melt the metal powder for cladding; and
a controller, wherein
the powder supplier is to supply the metal powder to the portion to be processed by gas pressure, and includes a gas pressure gauge to measure the gas pressure, and
the controller is configured to store, as an initial value, a measurement by the gas pressure gauge when the metal powder supplied by the gas pressure reaches the portion to be processed, and the controller is configured to determine that the metal powder reaches the portion to be processed when the gas pressure gauge measures a same pressure as the initial value in operation after storing the initial value.

3. The laser cladding apparatus according to claim 2, wherein
the laser includes a nozzle exit sensor detachably to detect reaching of the metal powder to the portion to be processed, the gas pressure gauge measures gas pressure when receiving a reach signal from the nozzle exit sensor, and the controller is configured to store a value of the gas pressure as an initial value.

4. A method for operating the laser cladding apparatus according to claim 2, wherein operation until the controller stores the initial value is performed without applying laser.

\* \* \* \* \*